United States Patent

[11] 3,617,905

[72] Inventor Joseph N. Castelli
Kwajalein, Marshall Islands
[21] Appl. No. 881,032
[22] Filed Dec. 1, 1969
[45] Patented Nov. 2, 1971
[73] Assignee Sylvania Electric Products, Inc.

[54] MISSING PULSE GENERATOR
3 Claims, 2 Drawing Figs.
[52] U.S. Cl. .................................................. 328/120, 328/162
[51] Int. Cl. ..................................................... H04b 1/04
[50] Field of Search ........................................ 328/120, 162, 129; 307/234, 232

[56] References Cited
UNITED STATES PATENTS
3,213,375 10/1965 John .............................. 328/120 X
3,328,702 6/1967 Brown .......................... 328/120 X
3,458,822 7/1969 Hahn, Jr. ...................... 307/234

Primary Examiner—Donald D. Forrer
Assistant Examiner—B. P. Davis
Attorneys—Harry M. Saragovitz, Edward J. Kelly, Herbert Berl and Aubrey J. Dunn ABSTRACT: A device for supplying a pulse when a pulse is missing from a continuous train of pulses. The continuous train of pulses passes directly through the device and also to delay lines which delay each pulse so that it appears at the input of a gate circuit at approximately the same time as the next successive pulse would appear at the output of the device. If a pulse is missing, a previously received delayed pulse is passed by the gate to the output. When a pulse does appear, it inhibits the gate circuit from passing the delayed pulse.

MISSING PULSE GENERATOR

BACKGROUND OF THE INVENTION

In the recording of received radar data where it is necessary to correlate recorded data blocks with specific main bang numbers, there is a need for a device that will supply a substitute pulse or a series of substitute pulses whenever a pulse or a series of pulses are missing from a continuous train of equally spaced pulses. In a case where the main bang number is counted and recorded for correlation, a missing main bang pulse will cause the system to lose system timing.

It is the object of this invention to provide a device which can generate a substitute pulse or a series of substitute pulses whenever a pulse or series of pulses are missing from a continuous train of constantly spaced pulses.

SUMMARY OF THE INVENTION

Each pulse in a continuous train of pulses passes through the missing pulse generator. Should any one pulse or any series of pulses be missing, the missing pulse generator supplies the missing pulse or pulses. Each pulse passing through the missing pulse generator is also fed to a delay network. This network causes the pulse to be delayed enough to coincide with the next pulse passing through the missing pulse generator. If the next pulse is not received by the generator, the delayed pulse will be permitted to pass to the output of the missing pulse generator and thereby be substituted for the missing pulse. If each pulse in the pulse train appears, none of the delayed pulses will be permitted to pass to the output of the missing pulse generator.

A received pulse is used to make a gate inhibited when the delayed pulse from the previously passed pulse is received by the gate. Should a pulse not be received, the gate will be in the noninhibit condition when the delayed pulse is received by the gate. Thus, the delayed pulse is passed by the gate and appears at the output of the missing pulse generator. This pulse also appears at the input of the delay circuit and will be delayed to supply the next pulse, should the next pulse also be missing.

DESCRIPTION OF THE PREFERRED EMBODIMENT

Figure 1:
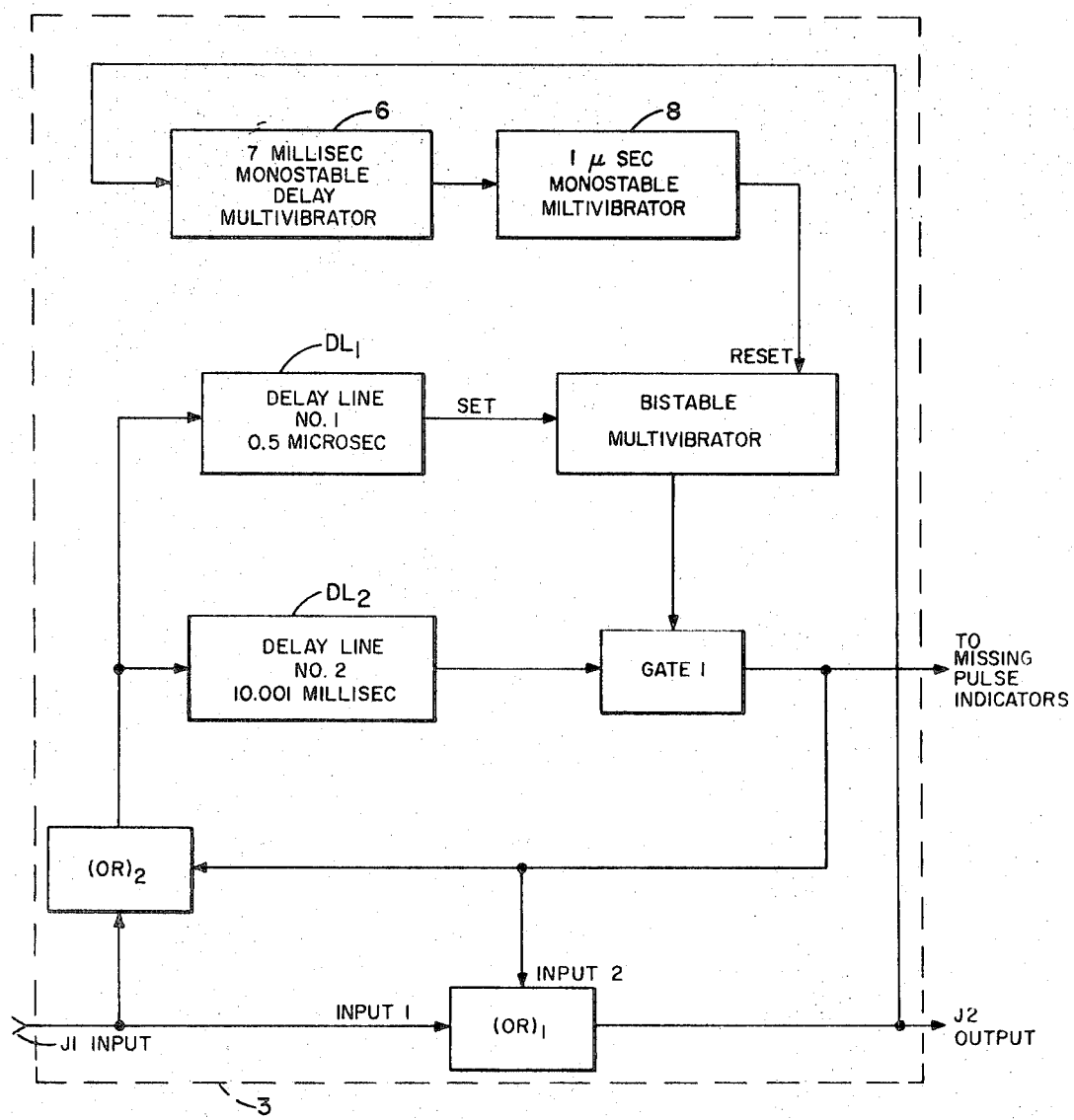
FIG. 1 is a block schematic diagram of the present invention.

Referring to FIG. 1, missing pulse generator 3 is inserted in series with a line transmitting a continuous train of equally spaced pulses. The pulse generator operates only to supply a pulse or a plurality of pulses when one or more pulses are missing from the pulse train. Exemplary values on the drawing for the delay lines are chosen for an input pulse train having a pulse repetition rate of 100 Hz.

Nonmissing Input Pulse Condition

The periodic input pulses are received at J1 and pass through the (OR)$_1$ circuit to output jack J2, as long as the input pulses occur at a constant 10 millisecond period (100 Hz. pulse repetition rate) missing pulse generator 3 will not deliver a substitute missing pulse to input 2 of (OR)$_1$.

A substitute pulse is generated within the missing pulse generator 3 for each input pulse presented at J1. The substitute pulse is prevented from passing through Gate 1 to input 2 of OR$_1$ by the presence of a pulse at J1. The internal operation of the missing pulse generator during the nonmissing pulse condition is as follows.

Figure 2:
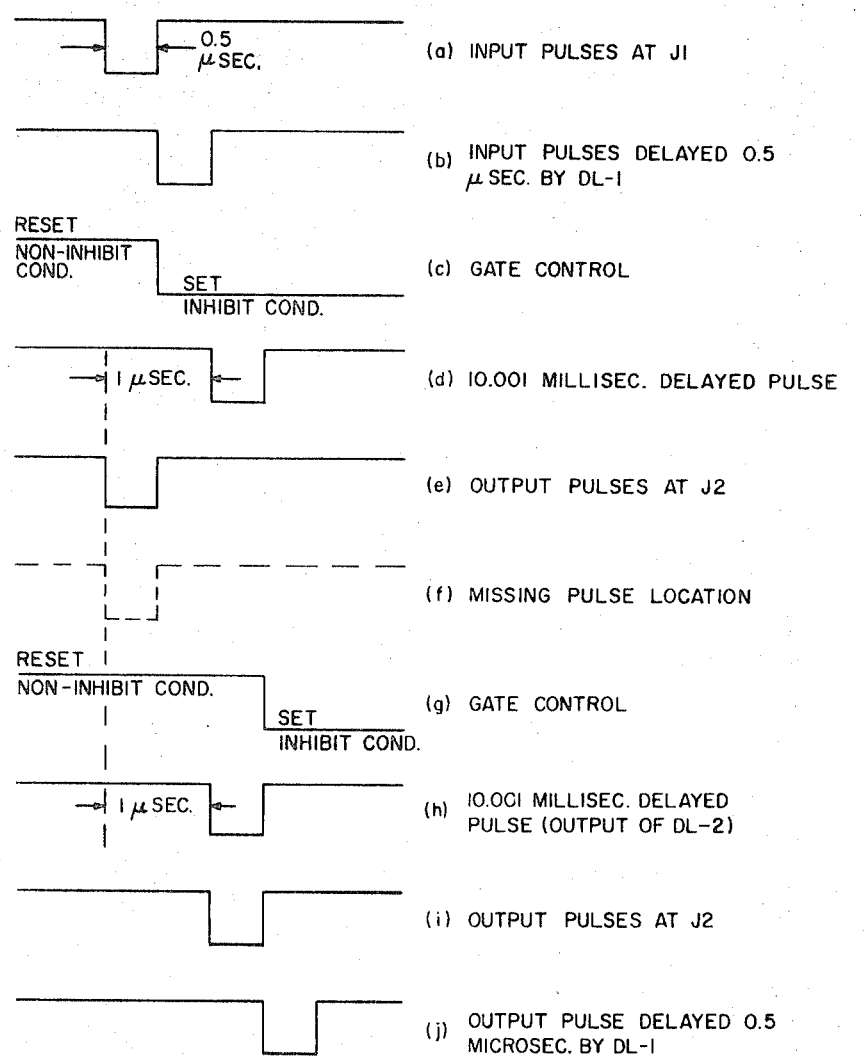
FIG. 2 is the pulse timing chart of the present invention.

Each of the constantly spaced pulses occurring at J1 and delivered to J2 will also pass through OR$_2$ and be delivered to the inputs of delay lines DL1 and DL2. The delay times of these delay lines are 0.5 μsec. and 10.001 millisec. (1 μsec. longer than the natural 100 p.p.s. period). FIG. 2a shows the input pulse at J1. FIG. 2b shows the input pulse delayed by the 0.5 μsec. delay line DL1. FIG. 2d shows the output pulse from 10.001 millisec. delay line DL2. The output pulse from DL2 is derived from the previous J1 input pulse and is delayed by one pulse rate frequency period (10 millisec.) plus 1 μsec.

The delayed 0.5 μsec. pulse at the output of DL1 (FIG. 2b) is used to set bistable multivibrator 2 whose output is shown in FIG. 2c. The bistable multivibrator's output is used for the control signal of Gate 1. In the "set" condition, the output of multivibrator 2 (FIG. 2c) inhibits the output of DL2 from passing through Gate 1. The only outputs to J2 are those received at J1 and passed through OR$_1$.

It is necessary to reset bistable multivibrator 2 before the next input pulse occurs at J1. This is accomplished by use of 7 millisec. multivibrator 6 and 1 μsec. monostable multivibrator. Output pulses occurring at J2 trigger the 7 millisec. multivibrator. The 1 μsec. multivibrator 8 triggers from the training edge of the output pulse of 7 millisec. multivibrator 6. The 1 μsec. output pulse from multivibrator 8 is used to reset bistable multivibrator 2, 3 millisec. prior to the occurrence of the next output pulse at J2.

The 7 millisec. period and the 1 μsec. pulse width are not critical. The particular delay and width are chosen for this example. What is required is a delay and pulse width capable of resetting the bistable multivibrator some time before the occurrence of the next output pulse at J2. This reset pulse could be made to occur anywhere between the output pulses at J2.

Missing Pulse Condition

Whenever an input pulse is missing from the train of constantly spaced input pulses at J1, the following events take place within the missing pulse generator. FIG. 2f shows the time location where a pulse should be received at input J1. Since it is not received, it is called a missing pulse and is indicated in dashed lines. With a pulse repetition frequency of 100 Hz., this location is 1 millisec. from the previous pulse. Bistable multivibrator 2 (FIG. 1) has been reset by the 7 millisec. delayed 1 μsec. pulse from the previous pulse at J1. The reset condition of the bistable multivibrator output control pulse will enable Gate 1 to pass input signals to its output. Since the input pulse to J1 is missing, the gate circuit will still be in the noninhibit condition (FIG. 2g) when the delayed pulse from the previous pulse appears at the output of 10.001 millisec. delay line DL2 (FIG. 2h). The output pulse from DL2 (FIG. 2h) will pass through Gate 1, through OR$_1$, and appear as the substitute output pulse at J2. Since this substitute timing pulse was derived from the previous input pulse and since the substitute pulse has passed through DL2, it is delayed 1 μsec. from the position where a nonmissing, regularly occurring input pulse at J1 would have occurred. The substitute pulse appearing at the output of Gate 1 is also routed through OR$_2$ to the input of DL1, the 0.5 μsec. delay line, and the input of 10.001 millisec. delay line 2. The output from the 0.5 μsec. delay line sets bistable multivibrator 2. The output from multivibrator 2 places Gate 1 in the inhibit condition (FIGS. 2j and 2g). The 0.5 μsec. delay of DL1 is necessary to permit Gate 1 to pass the entire 0.5 μsec. pulse before it is placed in the inhibit condition by its own output pulse.

The substitute pulse entering Dl2 is used as the next substitute pulse in the event the next regularly occurring pulse at J1 is missing. Where the next input pulse at J1 is missing the circuit operation is the same as previously explained for "Missing Pulse Condition." The substitute pulse is derived from the previously supplied substitute pulse. If the next regularly occurring pulse at J1 is not missing, the input pulse will set bistable multivibrator 2 so that its output will inhibit gate 1 from passing the 10.001 millisec. delayed pulse from DL2 and the circuit action will be as explained under "Nonmissing Input Pulse Condition."

This invention has been disclosed with particular values for delay lines and multivibrators and with reference to specific types of gate circuits. Specific values placed on the components of this invention are for ease of understanding and are not intended to limit the invention as claimed. Additionally, specific reference to $OR_1$ and $OR_2$ as OR gates is not intended to limit applicant's invention to only OR gates since two diodes inserted for $OR_1$ or $OR_2$, so as to permit conduction in the direction of the arrowheads in FIG. 1, would permit applicant's device to operate as disclosed.

I claim:

1. A missing pulse generator comprising: an input and an output; a first "OR " gate connected between said input and said output; a first delay line and a gate circuit connected between said input and said first "OR" gate; a second delay line and bistable multivibrator connected in series between said input and said gate; and a monostable multivibrator connected between said output and said bistable multivibrator for causing said gate circuit to pass the output of said delay line to said output.

2. A missing pulse generator as set forth in claim 1 wherein said bistable multivibrator has a set and reset input and an output; said monostable multivibrator being connected to said reset input and said second delay line being connected to said set input.

3. A missing pulse generator as set forth in claim 2 to further comprise a second "OR" gate connected between said first and second delay lines and said input; said gate circuit, said first "OR" gate and said second "OR" gate having a first input, a second input and an output; said first inputs of said first and second "OR" gates being connected to said input; said second inputs of said first and second "OR" gates being connected to said output of said gate circuit; said first input of said gate circuit being connected to said first delay line and said second input of said gate circuit being connected to the output of said bistable multivibrator.

* * * * *

UNITED STATES PATENT OFFICE
CERTIFICATE OF CORRECTION

Patent No. 3,617,905　　　　　　　　　　　Dated November 2, 1971

Inventor(s) Joseph N. Castelli

It is certified that error appears in the above-identified patent and that said Letters Patent are hereby corrected as shown below:

On the cover sheet [73], "Sylvania Electric Products, Inc." should read -- United States of America as represented by the Secretary of the Army --.

Signed and sealed this 12th day of September 1972.

(SEAL)
Attest:

EDWARD M. FLETCHER, JR.　　　　　　　ROBERT GOTTSCHALK
Attesting Officer　　　　　　　　　　Commissioner of Patents